(12) United States Patent
Deng (10) Patent No.: US 11,393,263 B2
(45) Date of Patent: Jul. 19, 2022

(54) METHOD AND DEVICE FOR MONITORING OPERATING STATUS OF VEHICLE

(71) Applicant: BAIDU ONLINE NETWORK TECHNOLOGY (BEIJING) CO., LTD., Beijing (CN)

(72) Inventor: Xiaofan Deng, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 323 days.

(21) Appl. No.: 16/552,480

(22) Filed: Aug. 27, 2019

(65) Prior Publication Data
US 2020/0074760 A1    Mar. 5, 2020

(30) Foreign Application Priority Data
Aug. 30, 2018  (CN) .......................... 201811005960.1

(51) Int. Cl.
*G07C 5/00* (2006.01)
*G07C 5/08* (2006.01)
(52) U.S. Cl.
CPC .......... *G07C 5/008* (2013.01); *G07C 5/0808* (2013.01); *G07C 5/0841* (2013.01)
(58) Field of Classification Search
CPC .... G07C 5/008; G07C 5/0841; G07C 5/0808; B60W 2050/0292; B60W 2556/10; B60W 2050/0075; B60W 40/10; B60W 40/00
See application file for complete search history.

(56) References Cited

U.S. PATENT DOCUMENTS

2009/0111520 A1  4/2009  Ring
2015/0112730 A1  4/2015  Binion et al.
2016/0358478 A1  12/2016  McCormick et al.

FOREIGN PATENT DOCUMENTS

| CN | 106915355 A | 7/2017 |
| EP | 2492163 A2 | 8/2012 |
| GB | 2548738 A | 9/2017 |
| JP | 2009146086 A | 7/2009 |

OTHER PUBLICATIONS

Japanese Patent Application No. 2019-152771 Office Action dated Nov. 10, 2020, 4 pages.

(Continued)

*Primary Examiner* — Michael V Kerrigan
(74) *Attorney, Agent, or Firm* — Lathrop GPM LLP (57) ABSTRACT

Provided are a method and device for monitoring an operating status of a vehicle. The method includes: acquiring a current position of the vehicle, operation behavior information of a user and operating status information of an in-vehicle component in a running process of the vehicle, determining a first running status of the vehicle according to the operation behavior information of the user and the operating status information of the in-vehicle component; acquiring, according to the current position of the vehicle, traffic information and environmental information corresponding to the current position of the vehicle at current time from a network side; determining a second running status of the vehicle according to the traffic information and the environmental information; and determining a current operating status of the vehicle according to a matching degree between the first running status and the second running status.

17 Claims, 6 Drawing Sheets

(56) References Cited

OTHER PUBLICATIONS

Japanese Patent Application No. 2019-152771 Office Action dated Nov. 10, 2020, 5 pages.
Chinese Patent Application No. 201811005960.1 Office Action dated Oct. 18, 2019, 10 pages.
Chinese Patent Application No. 201811005960.1 English translation of Office Action dated Oct. 18, 2019, 11 pages.
European Patent Application No. 19194216.8 extended Search and Opinion dated Feb. 13, 2020, 8 pages.

METHOD AND DEVICE FOR MONITORING OPERATING STATUS OF VEHICLE

CROSS-REFERENCE TO RELATED APPLICATION

This application claims priority to and benefits of Chinese Patent Application Serial No. 201811005960.1, filed with the National Intellectual Property Administration of P. R. China on Aug. 30, 2018, the entire content of which is incorporated herein by reference.

FIELD

The present disclosure relates to the field of vehicle technologies, and more particularly, to a method and device for monitoring the operating status of a vehicle.

BACKGROUND

At present, in most cases, a driver judges the operating status of a vehicle according to responses of the vehicle to a driving operation and to the feeling of the driver during the driving process. Bases on these judgments, the driver determines whether the vehicle needs to be maintained, for example, whether the brake needs to be repaired, or whether the wheel needs to be tightened, and so on. However, as no manual operation is involved in an automatic driving process of an autonomous vehicle, the status of the vehicle can only be evaluated based on data collected by vehicle sensors. Typically, abnormality is detected by the vehicle sensor after the occurrence of an abnormality. Therefore, the current method to determine the status of the autonomous vehicle is highly dependent on the vehicle sensor, and unable to predict the state of the vehicle in advance, which affects the safety and reliability of the autonomous vehicle.

SUMMARY

Embodiments of the present disclosure seek to solve at least one of the problems existing in the related art to at least some extent.

According to a first aspect of embodiments of the present disclosure, there is provided a method for monitoring an operating status of a vehicle, including: acquiring a current position of the vehicle, operation behavior information of a user and operating status information of an in-vehicle component in a running process of the vehicle; determining a first running status of the vehicle according to the operation behavior information of the user and the operating status information of the in-vehicle component; acquiring, according to the current position of the vehicle, traffic information and environmental information corresponding to the current position of the vehicle at current time from a network side; determining a second running status of the vehicle according to the traffic information and the environmental information; and determining a current operating status of the vehicle according to a matching degree between the first running status and the second running status.

According to a second aspect of embodiments of the present disclosure, there is provided an apparatus for monitoring an operating status of a vehicle, including: a first acquiring module, configured to acquire a current position of the vehicle, operation behavior information of a user and operating status information of an in-vehicle component in a running process of the vehicle; a first determining module, configured to determine a first running status of the vehicle according to the operation behavior information of the user and the operating status information of the in-vehicle component; a second acquiring module, configured to acquire, according to the current position of the vehicle, traffic information and environmental information corresponding to the current position of the vehicle at current time from a network side; a second determining module, configured to determine a second running status of the vehicle according to the traffic information and the environmental information; and a third determining module, configured to determine a current operating status of the vehicle according to a matching degree between the first running status and the second running status.

According to a third aspect of embodiments of the present disclosure, there is provided a computer device, including: a processor; a memory; and a computer program stored in the memory and executable by the processor, in which when the program is executed by the processor, the method for monitoring an operating status of a vehicle according to any embodiment of the first aspect is implemented.

According to a fourth aspect of embodiments of the present disclosure, there is provided a non-transitory computer-readable storage medium having stored therein a computer program that, when executed by a processor, causes the method for monitoring an operating status of a vehicle according to any embodiment of the first aspect to be implemented.

According to a fifth aspect of embodiments of the present disclosure, there is provided a computer program, in which when the computer program is executed by a processor, the method for monitoring an operating status of a vehicle according to any embodiment of the first aspect is implemented.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Reference will be made in detail to embodiments of the present disclosure, examples of which are illustrated in the accompanying drawings. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In order to solve at least one of the problems existing in the related art that the detection of an operating status of an autonomous vehicle is highly dependent on vehicle sensors and the vehicle status cannot be predicted in advance, embodiments of the present disclosure provide a method, apparatus, and device for monitoring an operating status of a vehicle.

According to embodiments of the present disclosure, by determining a first running status of a vehicle according to required operation behavior information of a user and operating status information of an in-vehicle component; acquiring, according to a required current position of the vehicle, traffic information and environmental information corresponding to the current position of the vehicle at current time; determining a second running status of the vehicle according to the traffic information and the environmental information; and determining a current operating status of the vehicle according to a matching degree between the first running status and the second running status, the status of the vehicle can be predicted in advance according to the running position of the vehicle, the operation behavior of the user and the operating status of the in-vehicle component, which not only reduces the dependence on a vehicle sensor, but also facilitates the user to take a corresponding measure according to the predicted vehicle status, thereby providing safety and reliability guarantees for the user to drive the vehicle.

In the following, the method, apparatus, and device for monitoring an operating status of a vehicle will be described in detail with reference to drawings and in combination with the following embodiments.

According to a first aspect of embodiments of the present disclosure, there is provided a method for monitoring an operating status of a vehicle, which will be described in detail as follows.

Figure 1:
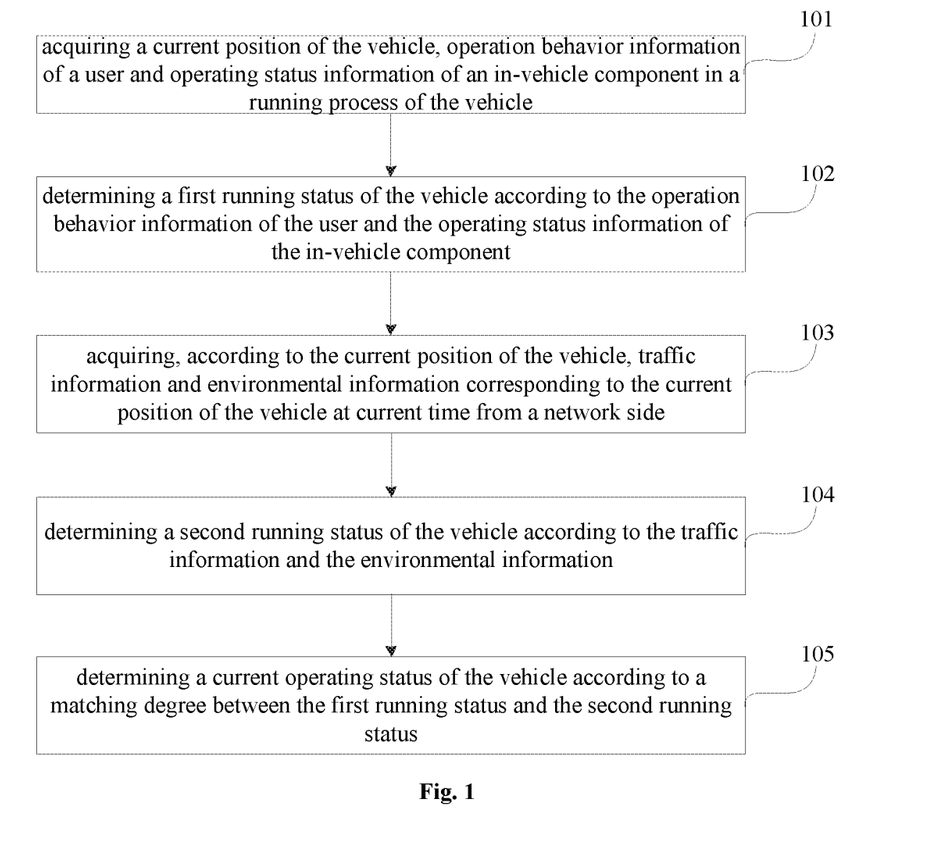
FIG. 1 is a flow chart of a method for monitoring an operating status of a vehicle according to an embodiment of the present disclosure.

FIG. 1 is a flow chart of a method for monitoring an operating status of a vehicle according to an embodiment of the present disclosure. As illustrated in FIG. 1, the method may include the following actions as illustrated at blocks of FIG. 1.

At block 101, a current position of the vehicle, operation behavior information of a user and operating status information of an in-vehicle component are acquired in a running process of the vehicle.

It should be illustrated that, the term "vehicle" used in embodiments of the present disclosure may be any vehicle, including but not limited to, such as a manually driven vehicle or an autonomous vehicle, etc.

It should be illustrated that, the method for monitoring an operating status of a vehicle provided in embodiments of the present disclosure is executable by a computer device as described in the following embodiments of the present disclosure. The computer device is provided with an apparatus for monitoring an operating status of a vehicle, so as to monitor an operating status of an autonomous vehicle. The computer device according to embodiments of the present disclosure may be any hardware device with a data processing function, such as a computer, a server, etc.

The term "operation behavior information of a user" as used herein may refer to information of an operation that is manually carried out by the user for controlling a function of the vehicle, for example, controlling a steering wheel to adjust its angle or stepping on an accelerator pedal to accelerate the vehicle and so on; alternatively, may also refer to information sent to the vehicle by the user via such as a voice manner and the like for controlling the vehicle, such as for controlling a speed of the vehicle or the angle of the steering wheel.

Alternatively, the current position of the vehicle may be acquired through a global positioning system (GPS); and the operation behavior information of the user and the operating status information of the in-vehicle component may be acquired by sending a data acquiring request to an electronic control unit (ECU) or an on-board diagnostic (OBD).

It should be illustrated that, the acquired operating status information of the in-vehicle component may include, but is not limited to, such as an engine speed, a throttle opening degree, a coolant temperature, etc.

At block 102, a first running status of the vehicle is determined according to the operation behavior information of the user and the operating status information of the in-vehicle component.

The first running status refers to an actual operating status of the vehicle in the current running process.

For example, if the operation behavior information of the user indicates to "drive faster slightly", and in the operating status information of individual in-vehicle components, the throttle opening degree controlled by the accelerator pedal is changed from A1 to A2, the engine speed is changed from B1 to B2, then the computer device is able to determine the first running status of the vehicle according to stepping on the accelerator pedal, the throttle opening degree and the engine speed.

If A2 is greater than A1, indicating that the engine speed is increasing, i.e., B2 is also greater than B1, it can be determined that the vehicle is currently accelerating.

If A2 is less than A1, indicating that the engine speed is decreasing, i.e., B2 is also less than B1, it can be determined that the vehicle is currently slowing down.

For determining the acceleration or deceleration of the vehicle, it is also possible to obtain running speed information of the vehicle by a speed sensor.

At block 103, based on the current position of the vehicle, traffic information and environmental information corresponding to the current position of the vehicle at current time are acquired from a network side.

The term "network side" as used herein refers to a network entity from which the vehicle may acquire the traffic information and the environmental information corresponding to the vehicle position. The network entity may communicate with a weather server and a traffic server in real time so as to obtain the traffic information and the environmental information of various roads. The network entity may include but is not limited to, such as a local device, a cloud device, etc.

In embodiments of the present disclosure, the traffic information may include but is not limited to that, for example, the road is clear or is under construction, vehicles move slowly, or the traffic is congested, etc.

The environmental information may include, but is not limited to, such as weather information, traffic flow nearby or service station information, etc.

Alternatively, after the current position of the vehicle is acquired, the computer device may communicate with the weather server and the traffic server to acquire the traffic information and the environmental information corresponding to the current position of the vehicle at the current time.

Further, in an embodiment of the present disclosure, the traffic information and the environmental information corresponding to the current position of the vehicle at the current time, after acquired from the network side, may be corrected according to data collected by vehicle sensors, thereby making the acquired traffic information and environmental information more reliable and accurate.

At block 104, a second running status of the vehicle is determined according to the traffic information and the environmental information.

The term "second running status" as used herein refers to a normal running status determined based on the traffic information and the environmental information at the current position of the vehicle.

For example, if the traffic information and the environmental information corresponding to the current position of the vehicle and acquired from the network side show that the current road is clear, and the weather is fine, then the second running status of the vehicle is determined to be that the vehicle can continue running at the current speed or at an accelerated speed.

It should be illustrated that, in embodiments of the present disclosure, the sequence for determining the first running status and the second running status of the vehicle is not specifically limited. For example, the action as illustrated at block 102 may be executed prior to, subsequent to, or at the same time with the action as illustrated at block 103. Therefore, the embodiment where the action illustrated at block 102 is executed prior to the action illustrated at block 103 is only illustrative, and shall not be construed to limit the present disclosure.

At block 105, a current operating status of the vehicle is determined according to a matching degree between the first running status and the second running status.

The current operating status of the vehicle may include a normal status and an abnormal status.

Alternatively, in some embodiments of the present disclosure, the determined first running status and second running status may be input into a preset matching model to calculate the matching degree between the first running status and the second running status. Further, the current operating status of the vehicle is determined based on the matching degree.

In an embodiment, the preset matching model may be generated by training a large amount of experimental data, which is not specifically limited herein.

In an embodiment, the current operating status of the vehicle may be determined by comparing the calculated matching degree with a preset threshold. If the calculated matching degree is greater than the preset threshold, indicating that the first running status is the same as the second running status, it is determined that the current operating status of the vehicle is normal, otherwise, it is determined that the current operating status of the vehicle is abnormal.

For example, if the preset threshold is 98%, and the matching degree calculated by the preset matching model with the first running status and the second running status as inputs is 99%, then it can be determined that the matching degree between the first running status and the second running status is greater than the preset threshold, and the current operating status of the vehicle is normal.

For another example, if the preset threshold is 98%, and the matching degree calculated by the preset matching model with the first running status and the second running status as inputs is 92%, then it can be determined that the matching degree between the first running status and the second running status is less than the preset threshold, and the current operating status of the vehicle is abnormal.

Further, when the current operating status of the vehicle is abnormal, a prompt message may be sent to the client of the vehicle, so that the user using the vehicle may check and repair the vehicle according to the prompt message so as to ensure the subsequent normal use of the vehicle, thereby improving the safety and reliability in driving the vehicle.

With the method for monitoring an operating status of a vehicle according to embodiments of the present disclosure, the current position of the vehicle, the operation behavior information of the user and the operating status information of the in-vehicle component are acquired; the first running status of the vehicle is determined according to the operation behavior information of the user and the operating status information of the in-vehicle component; and the traffic information and the environmental information corresponding to the current position of the vehicle at current time are acquired from the network side according to the current position of the vehicle; further, the second running status of the vehicle is determined according to the traffic information and the environmental information; and then the current operating status of the vehicle is determined according to the matching degree between the first running status and the second running status. Therefore, the status of the vehicle can be predicted in advance according to the running position of the vehicle, the operation behavior of the user and the operating status of the in-vehicle component, which not only reduces the dependence on the vehicle sensor, but also facilitates the user to take a corresponding measure according to the predicted vehicle status, thereby providing safety and reliability guarantees for the user to drive the vehicle.

As analyzed above, in embodiments of the present disclosure, the current operating status of the vehicle is determined based on the matching degree between the first running status and the second running status, in which the first running status is determined according to the operation behavior information of the user and the operating status information of the in-vehicle component, and the second running status is determined according to the traffic information and the environmental information corresponding to the current position of the vehicle.

In practical use, the first running status determined according to the operation behavior information of the user and the operating status information of the in-vehicle component may not be completely accurate. For this, in some embodiments of the present disclosure, the first running status may be sent to the client of the vehicle, so that the user may return his feeling as a feedback on the first running status, which is conducive to update the first running status based on user's actual feeling, thereby making the accuracy of the first running status higher. Therefore, embodiments of the present disclosure further provide a method for monitoring an operating status of a vehicle, which will be described in detail with reference to FIG. 2.

Figure 2:
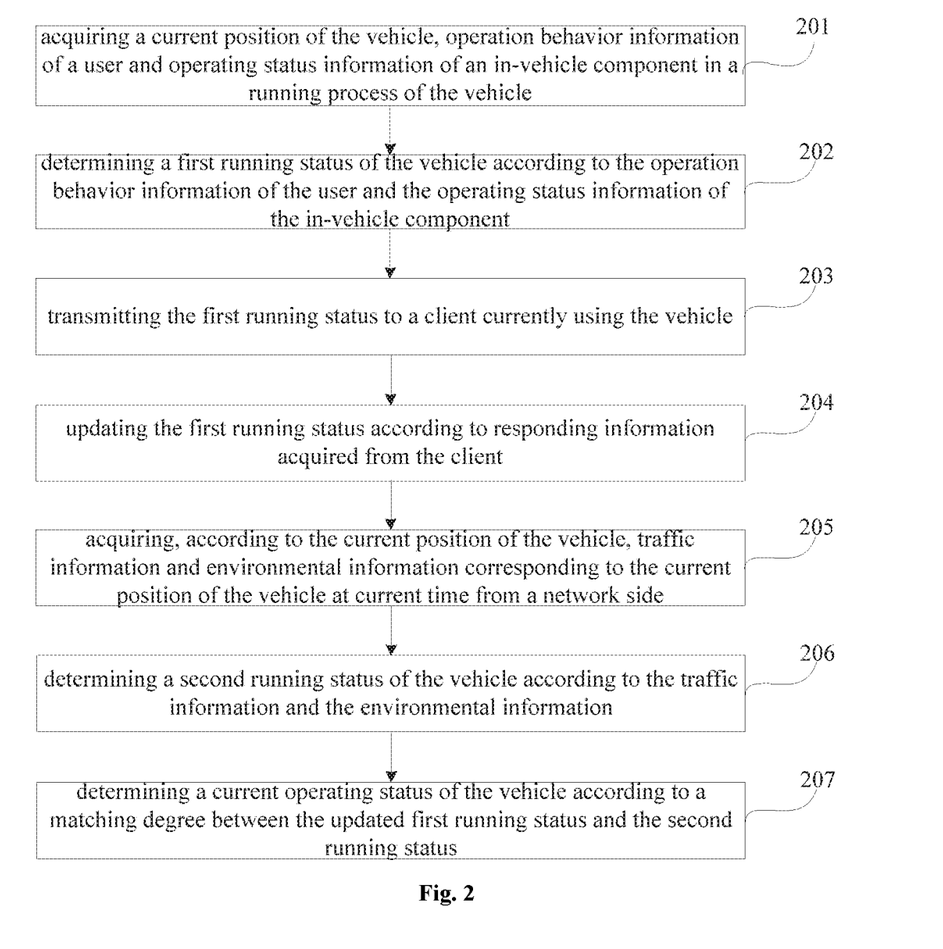
FIG. 2 is a flow chart of a method for monitoring an operating status of a vehicle according to an embodiment of the present disclosure.

FIG. 2 is a flow chart of a method for monitoring an operating status of a vehicle according to an embodiment of the present disclosure. As illustrated in FIG. 2, the method may include the following actions as illustrated at blocks of FIG. 2.

At block 201, a current position of the vehicle, operation behavior information of a user and operating status information of an in-vehicle component are acquired in a running process of the vehicle.

At block 202, a first running status of the vehicle is determined according to the operation behavior information of the user and the operating status information of the in-vehicle component.

At block 203, the first running status is transmitted to a client currently using the vehicle.

At block 204, the first running status is updated according to responding information acquired from the client.

The term "client" as used herein may include, but is not limited to, such as an in-vehicle multimedia device, a smart phone, etc.

In an embodiment, the first running status may be transmitted to the client currently using the vehicle via wireless network, 3G, 4G, etc.

After receiving the first running status, the client may display the information related to the first running status, so that the user may modify the information having an error or add other information according to his actual experiences, and return the modified information and the added information to the computer device as the responding information, so that the computer device may update the first running status according to the responding information returned by the client.

Further, since a centre-of-gravity position of the vehicle depends on the gravity distribution of the entire vehicle, the centre-of-gravity position of the vehicle will change with the number of passengers and the position of each passenger in the vehicle. With the centre-of-gravity position of the vehicle changes, passengers sitting in different positions of the vehicle will have different feels on the stability of the vehicle. For example, when there are three passengers in the vehicle, of which two sit on the right side, and one sits on the left side, then the passengers sitting on the right side may feel that the vehicle as a whole is tilted to the right. As a result, the passengers may have poor feelings on the stability of the vehicle.

For this, after the first running status is transmitted to the client currently using the vehicle, the user may send his feeling of riding the vehicle, such as poor stability, to the computer device as feedback, so that the computer device may update the first running status according to the responding information returned by the client.

At block 205, traffic information and environmental information corresponding to the current position of the vehicle at current time are acquired from a network side according to the current position of the vehicle.

At block 206, a second running status of the vehicle is determined according to the traffic information and the environmental information.

At block 207, a current operating status of the vehicle is determined according to a matching degree between the updated first running status and the second running status.

With the method for monitoring an operating status of a vehicle according to embodiments of the present disclosure, the first running status of the vehicle determined according to the operation behavior information of the user and the operating status information of the in-vehicle component is transmitted to the client currently using the vehicle, and the user using the vehicle may return his actual experiences as the responding information, so that the first running status may be updated according to the responding information returned by the client, which is conducive to improve the accuracy of the first running status of the vehicle, and thus makes the current operating status of the vehicle determined based on the first running status and the second running status more reliable, thereby providing safety and reliability guarantees for the user to drive the vehicle.

As analyzed above, in embodiments of the present disclosure, by transmitting the first running status to the client and receiving the responding information returned by the client, the first running status may be updated, and then the current operating status of vehicle may be determined according to the updated first running status and the second running status.

In another implementation scenario of the present disclosure, the user may have repaired the vehicle. For this, in some embodiments of the present disclosure, the first running status of the vehicle may be determined according to historical fault and maintenance information of the vehicle, the operation behavior information of the user and the operating status information of the in-vehicle component. Therefore, embodiments of the present disclosure further provide a method for monitoring an operating status of a vehicle, which will be described in detail with reference to FIG. 3.

Figure 3:
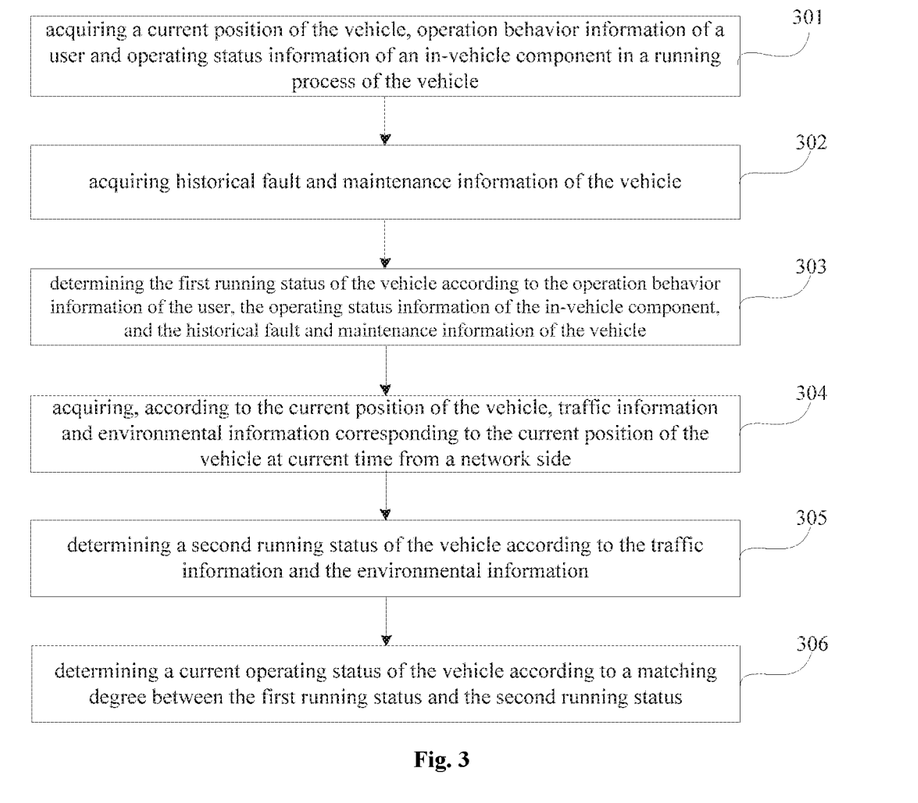
FIG. 3 is a flow chart of a method for monitoring an operating status of a vehicle according to an embodiment of the present disclosure.

FIG. 3 is a flow chart of a method for monitoring an operating status of a vehicle according to an embodiment of the present disclosure. As illustrated in FIG. 3, the method may include the following actions as illustrated at blocks of FIG. 3.

At block 301, a current position of the vehicle, operation behavior information of a user and operating status information of an in-vehicle component are acquired in a running process of the vehicle.

At block 302, historical fault and maintenance information of the vehicle is required.

Alternatively, the historical fault and maintenance information of the vehicle may be required via the following manners.

Manner I

The historical fault and maintenance information of the vehicle is acquired according to a vehicle identification number (hereinafter referred to as VIN).

As the VIN is a unique identifier of the vehicle, in an embodiment, the historical fault and maintenance information of the vehicle can be acquired from a corresponding inquiry system according to the VIN.

Manner II

The historical fault and maintenance information of the vehicle may be acquired from a dealer management system (hereinafter referred to as DMS).

In an embodiment, the DMS system includes all the information related to such as purchase and maintenance, of the vehicle.

Usually, an automobile sales service shop (hereinafter referred to as 4S) is a four-in-one automobile sales company that integrates sale, spare part, after-sales service, and survey, and each 4S shop has a DMS system. Therefore, in an embodiment, the historical fault and maintenance information of the vehicle may be acquired by querying the DMS system.

At block 303, the first running status of the vehicle is determined according to the operation behavior information of the user, the operating status information of the in-vehicle component, and the historical fault and maintenance information of the vehicle.

Generally, the performance of a repaired part of the vehicle is degraded as compared with a normal part. Taken this into consideration, in some embodiments of the present disclosure, the first running status of the vehicle is determined according to the operation behavior information of the user, the operating status information of the in-vehicle component, and the historical fault and maintenance information of the vehicle, thereby making the determined first running status more in line with the actual operating performance of the vehicle.

Further, in an embodiment, the first running status of the vehicle, after determined, may be transmitted to the client currently using the vehicle; and may be updated according to the responding information returned by the client.

The detailed implementation process may refer to the above-mentioned embodiments, and will not be elaborated herein.

At block 304, traffic information and environmental information corresponding to the current position of the vehicle at current time are acquired from a network side according to the current position of the vehicle.

At block 305, a second running status of the vehicle is determined according to the traffic information and the environmental information.

At block 306, a current operating status of the vehicle is determined according to a matching degree between the first running status and the second running status.

With the method for monitoring an operating status of a vehicle, the operation behavior information of the user, the operating status information of the in-vehicle component and the historical fault and maintenance information of the vehicle are required, based on which the first running status of the vehicle is determined. Therefore, the first running status determined in combination with the historical fault and maintenance information of the vehicle is in line with the current performance of the vehicle, and thus the current operating status of the vehicle further determined according to the first running status and the second running status is more reliable, and has a higher reference value, thereby effectively ensuring the safety of the user.

As analyzed above, in some embodiments of the present disclosure, the first running status of the vehicle is determined according to the required historical fault and maintenance information of the vehicle, the operation behavior information of the user and the operating status information of the in-vehicle component, and then the current operating status of the vehicle is determined according to the first running status and the second running status.

In an embodiment, the current operating status of the vehicle, after determined according to the matching degree between the first running status and the second running status, may be sent to a vehicle managing server, so that the vehicle managing server may determine a dispatching mode for the vehicle according to the current operating status of the vehicle. Therefore, embodiments of the present disclosure further provide a method for monitoring an operating status of a vehicle, which will be described in detail with reference to FIG. 4.

Figure 4:
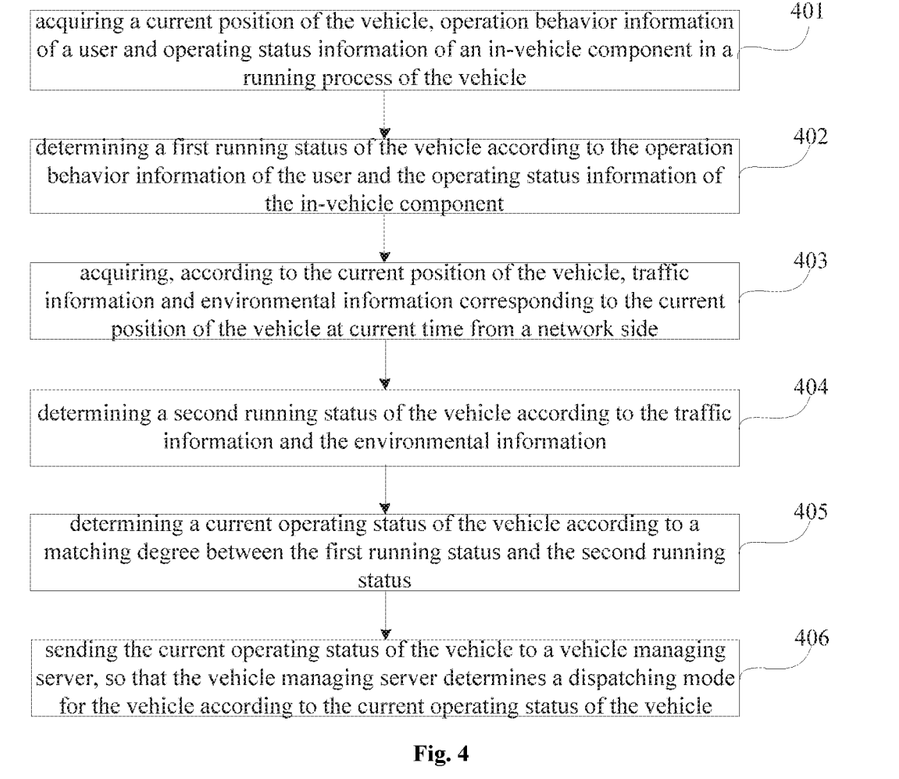
FIG. 4 is a flow chart of a method for monitoring an operating status of a vehicle according to an embodiment of the present disclosure.

FIG. 4 is a flow chart of a method for monitoring an operating status of a vehicle according to an embodiment of the present disclosure. As illustrated in FIG. 4, the method may include the following actions as illustrated at blocks of FIG. 4.

At block 401, a current position of the vehicle, operation behavior information of a user and operating status information of an in-vehicle component are acquired in a running process of the vehicle.

At block 402, a first running status of the vehicle is determined according to the operation behavior information of the user and the operating status information of the in-vehicle component.

At block 403, traffic information and environmental information corresponding to the current position of the vehicle at current time are acquired from a network side according to the current position of the vehicle.

At block 404, a second running status of the vehicle is determined according to the traffic information and the environmental information.

At block 405, a current operating status of the vehicle is determined according to a matching degree between the first running status and the second running status.

At block 406, the current operating status of the vehicle is sent to a vehicle managing server, so that the vehicle managing server determines a dispatching mode for the vehicle according to the current operating status of the vehicle.

In this embodiment, the vehicle managing server is capable of dispatching the vehicle. Therefore, the current operating status of the vehicle, after determined, may be sent to the vehicle managing server, so that the vehicle managing server may determine the dispatching mode for the vehicle according to the current operating status of the vehicle.

For example, if the current operating status of the vehicle is normal, the vehicle management server may classify the vehicle into a fleet in which the current operating status of each vehicle is normal, and perform a unified management on the fleet, such as distributing tasks to individual vehicles in the fleet and managing the individual vehicles to perform the corresponding task.

For another example, if the current operating status of the vehicle is abnormal, the vehicle management server may perform security maintenance on the vehicle, so as to enable the vehicle to restore the normal operating status and thus enable the vehicle to be used normally.

With the method for monitoring an operating status of a vehicle according to embodiments of the present disclosure, the current operating status of the vehicle is transmitted to the vehicle managing server, so that the vehicle managing server may take different dispatching modes for vehicles having different current operating statuses, and thus achieve targeted managements on vehicles according to the current operating statuses of the vehicles, which enables the vehicles to always maintain an optimal working status, thereby ensuring the safety and reliability of the user in driving the vehicle, and improving user experiences.

In order to implement the embodiments as described hereinbefore, embodiments of a second aspect of the present disclosure further provide an apparatus for monitoring an operating status of a vehicle.

Figure 5:
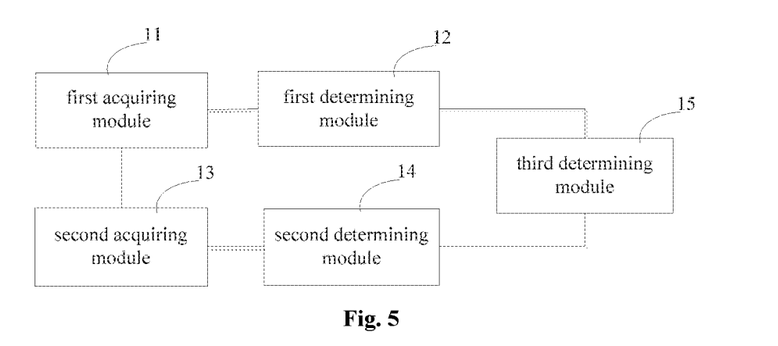
FIG. 5 is a block diagram of an apparatus for monitoring an operating status of a vehicle according to an embodiment of the present disclosure.

FIG. 5 is a block diagram of an apparatus for monitoring an operating status of a vehicle according to an embodiment of the present disclosure. As illustrated in FIG. 5, the apparatus includes: a first acquiring module 11, a first determining module 12, a second acquiring module 13, a second determining module 14 and a third determining module 15.

The first acquiring module 11 is configured to acquire a current position of the vehicle, operation behavior information of a user and operating status information of an in-vehicle component in a running process of the vehicle.

The first determining module 12 is configured to determine a first running status of the vehicle according to the operation behavior information of the user and the operating status information of the in-vehicle component.

The second acquiring module 13 is configured to acquire, according to the current position of the vehicle, traffic information and environmental information corresponding to the current position of the vehicle at current time from a network side.

The second determining module 14 is configured to determine a second running status of the vehicle according to the traffic information and the environmental information.

The third determining module 15 is configured to determine a current operating status of the vehicle according to a matching degree between the first running status and the second running status.

As an alternative implementation of embodiments of the present disclosure, the apparatus for monitoring an operating status of a vehicle further includes a correcting module.

The correcting module is configured to correct the acquired traffic information and the environmental information according to data collected by an in-vehicle sensor.

It should be illustrated that, the implementation principles of embodiments of the apparatus for monitoring an operating status of a vehicle are similar to that of the method for monitoring an operating status of a vehicle, and thus explanations and illustrations made hereinbefore for embodiments of the method for monitoring an operating status of a vehicle are also applicable to embodiments of the apparatus for monitoring an operating status of a vehicle, and will not be elaborated herein.

With the apparatus for monitoring an operating status of a vehicle according to embodiments of the present disclosure, the current position of the vehicle, the operation behavior information of the user and the operating status information of the in-vehicle component are acquired; the first running status of the vehicle is determined according to the operation behavior information of the user and the operating status information of the in-vehicle component; and the traffic information and the environmental information corresponding to the current position of the vehicle at current time are acquired from the network side according to the current position of the vehicle; further, the second running status of the vehicle is determined according to the traffic information and the environmental information; and then the current operating status of the vehicle is determined according to the matching degree between the first running status and the second running status. Therefore, the status of the vehicle can be predicted in advance according to the running position of the vehicle, the operation behavior of the user and the operating status of the in-vehicle component, which not only reduces the dependence on the vehicle sensor, but also facilitates the user to take a corresponding measure according to the predicted vehicle status, thereby providing safety and reliability guarantees for the user to drive the vehicle.

Figure 6:
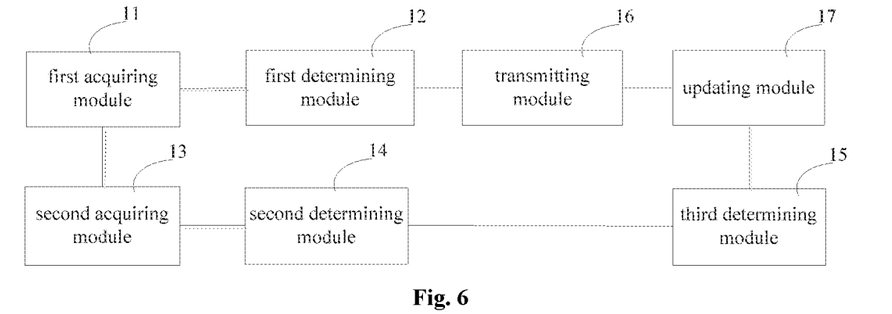
FIG. 6 is a block diagram of an apparatus for monitoring an operating status of a vehicle according to an embodiment of the present disclosure.

FIG. 6 is a block diagram of an apparatus for monitoring an operating status of a vehicle according to an embodiment of the present disclosure. As illustrated in FIG. 6, the apparatus includes: a first acquiring module 11, a first determining module 12, a second acquiring module 13, a second determining module 14, a third determining module 15, a transmitting module 16 and an updating module 17.

The first acquiring module 11 is configured to acquire a current position of the vehicle, operation behavior information of a user and operating status information of an in-vehicle component in a running process of the vehicle.

The first determining module 12 is configured to determine a first running status of the vehicle according to the operation behavior information of the user and the operating status information of the in-vehicle component.

The second acquiring module 13 is configured to acquire, according to the current position of the vehicle, traffic information and environmental information corresponding to the current position of the vehicle at current time from a network side.

The second determining module 14 is configured to determine a second running status of the vehicle according to the traffic information and the environmental information.

The third determining module 15 is configured to determine a current operating status of the vehicle according to a matching degree between the first running status and the second running status.

The transmitting module 16 is configured to transmit the first running status to a client currently using the vehicle.

The updating module 17 is configured to update the first running status according to responding information acquired from the client.

It should be illustrated that, the implementation principles of embodiments of the apparatus for monitoring an operating status of a vehicle are similar to that of the method for monitoring an operating status of a vehicle, and thus explanations and illustrations made hereinbefore for embodiments of the method for monitoring an operating status of a vehicle are also applicable to embodiments of the apparatus for monitoring an operating status of a vehicle, and will not be elaborated herein.

With the apparatus for monitoring an operating status of a vehicle according to embodiments of the present disclosure, the first running status of the vehicle determined according to the operation behavior information of the user and the operating status information of the in-vehicle component is transmitted to the client currently using the vehicle, and the user using the vehicle may return his actual experiences as the responding information, so that the first running status may be updated according to the responding information returned by the client, which is conducive to improve the accuracy of the first running status of the vehicle, and thus makes the current operating status of the vehicle determined based on the first running status and the second running status more reliable, thereby providing safety and reliability guarantees for the user to drive the vehicle.

Figure 7:
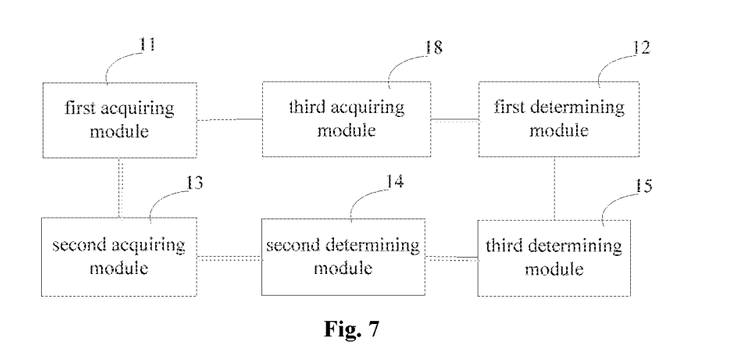
FIG. 7 is a block diagram of an apparatus for monitoring an operating status of a vehicle according to an embodiment of the present disclosure.

FIG. 7 is a block diagram of an apparatus for monitoring an operating status of a vehicle according to an embodiment of the present disclosure. As illustrated in FIG. 7, the apparatus includes: a first acquiring module 11, a first determining module 12, a second acquiring module 13, a second determining module 14, a third determining module 15 and a third acquiring module 18.

The first acquiring module 11 is configured to acquire a current position of the vehicle, operation behavior information of a user and operating status information of an in-vehicle component in a running process of the vehicle.

The first determining module 12 is configured to determine a first running status of the vehicle according to the operation behavior information of the user and the operating status information of the in-vehicle component.

The second acquiring module 13 is configured to acquire, according to the current position of the vehicle, traffic information and environmental information corresponding to the current position of the vehicle at current time from a network side.

The second determining module 14 is configured to determine a second running status of the vehicle according to the traffic information and the environmental information.

The third determining module 15 is configured to determine a current operating status of the vehicle according to a matching degree between the first running status and the second running status.

As an alternative implementation, the apparatus for monitoring an operating status of a vehicle further includes the third acquiring module 18.

The third acquiring module 18 is configured to acquire historical fault and maintenance information of the vehicle.

The first determining module 12 is further configured to determine the first running status of the vehicle according to the operation behavior information of the user, the operating status information of the in-vehicle component, and the historical fault and maintenance information of the vehicle.

It should be illustrated that, the implementation principles of embodiments of the apparatus for monitoring an operating status of a vehicle are similar to that of the method for monitoring an operating status of a vehicle, and thus explanations and illustrations made hereinbefore for embodiments of the method for monitoring an operating status of a vehicle are also applicable to embodiments of the apparatus for monitoring an operating status of a vehicle, and will not be elaborated herein.

With the apparatus for monitoring an operating status of a vehicle, the operation behavior information of the user, the operating status information of the in-vehicle component and the historical fault and maintenance information of the vehicle are required, based on which the first running status of the vehicle is determined. Therefore, the first running status determined in combination with the historical fault and maintenance information of the vehicle is in line with the current performance of the vehicle, and thus the current operating status of the vehicle further determined according to the first running status and the second running status is more reliable, and has a higher reference value, thereby effectively ensuring the safety of the user.

Figure 8:
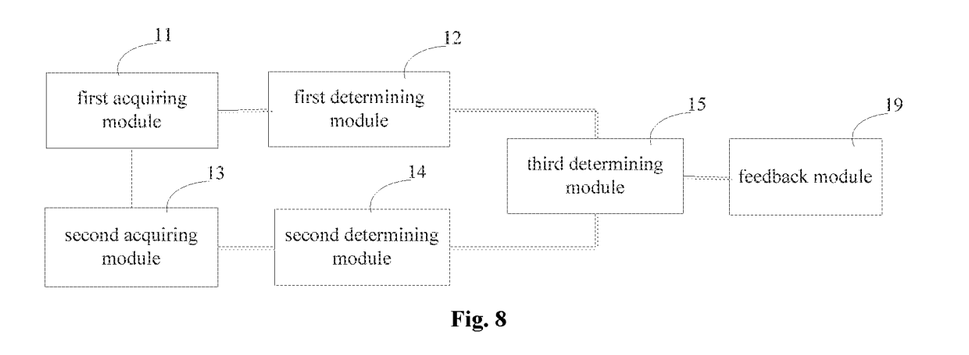
FIG. 8 is a block diagram of an apparatus for monitoring an operating status of a vehicle according to an embodiment of the present disclosure.

FIG. 8 is a block diagram of an apparatus for monitoring an operating status of a vehicle according to an embodiment of the present disclosure. As illustrated in FIG. 8, the apparatus includes: a first acquiring module 11, a first determining module 12, a second acquiring module 13, a second determining module 14, a third determining module 15 and a feedback module 19.

The first acquiring module 11 is configured to acquire a current position of the vehicle, operation behavior information of a user and operating status information of an in-vehicle component in a running process of the vehicle.

The first determining module 12 is configured to determine a first running status of the vehicle according to the operation behavior information of the user and the operating status information of the in-vehicle component.

The second acquiring module 13 is configured to acquire, according to the current position of the vehicle, traffic information and environmental information corresponding to the current position of the vehicle at current time from a network side.

The second determining module 14 is configured to determine a second running status of the vehicle according to the traffic information and the environmental information.

The third determining module 15 is configured to determine a current operating status of the vehicle according to a matching degree between the first running status and the second running status.

As an alternative implementation, the apparatus for monitoring an operating status of a vehicle further includes the feedback module 19.

The feedback module 19 is configured to send the current operating status of the vehicle to a vehicle managing server, so that the vehicle managing server determines a dispatching mode for the vehicle according to the current operating status of the vehicle.

It should be illustrated that, the implementation principles of embodiments of the apparatus for monitoring an operating status of a vehicle are similar to that of the method for monitoring an operating status of a vehicle, and thus explanations and illustrations made hereinbefore for embodiments of the method for monitoring an operating status of a vehicle are also applicable to embodiments of the apparatus for monitoring an operating status of a vehicle, and will not be elaborated herein.

With the apparatus for monitoring an operating status of a vehicle according to embodiments of the present disclosure, the current operating status of the vehicle is transmitted to the vehicle managing server, so that the vehicle managing server may take different dispatching modes for vehicles having different current operating statuses, and thus achieve targeted managements on vehicles according to the current operating statuses of the vehicles, which enables the vehicles to always maintain an optimal working status, thereby ensuring the safety and reliability of the user in driving the vehicle, and improving user experiences.

In order to implement the embodiments as described hereinbefore, embodiments of a third aspect of the present disclosure further provide a computer device.

Figure 9:
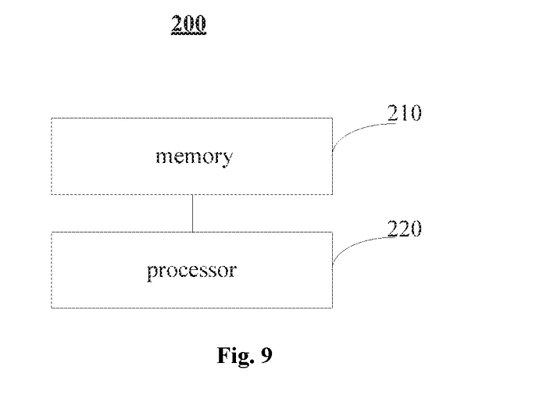
FIG. 9 is a block diagram of a computer device according to an embodiment of the present disclosure.

FIG. 9 is a block diagram of a computer device according to an embodiment of the present disclosure. It should be illustrated that, the computer device as shown in FIG. 9 is merely an example, and shall not be construed to limit functions and application scopes of the embodiments of the present disclosure.

As shown in FIG. 9, the above computer device 200 includes: a memory 210; a processor 220; and a computer program stored in the memory 210 and executable by the processor 220, in which when the program is executed by the processor 220, the method for monitoring an operating status of a vehicle as described in any embodiment of the first aspect of the present disclosure is implemented.

Figure 10:
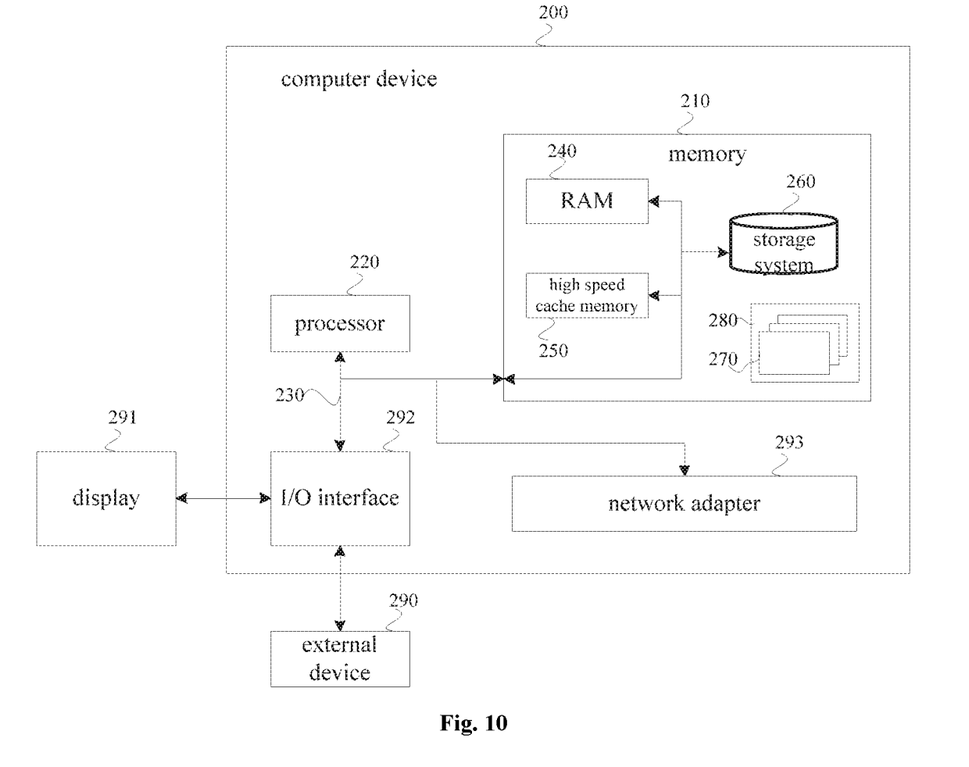
FIG. 10 is a block diagram of a computer device according to an embodiment of the present disclosure.

In an alternative implementation, as illustrated in FIG. 10, the computer device 200 may include: a memory 210; a processor 220; and a bus 230 connecting various components including the memory 210 and the processor 220. The memory 210 has stored therein a computer program that, when executed by the processor 220, causes the method for monitoring an operating status of a vehicle as described in any embodiment of the first aspect of the present disclosure to be implemented.

The bus 230 represents one or more of several types of bus structures, including a memory bus or a memory controller, a peripheral bus, a graphics acceleration port, a processor, or a local bus using any of a variety of bus structures. For example, these architectures may include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (hereinafter referred to as PCI) bus.

The computer device 200 typically includes a variety of computer system readable media. These media may be any available media accessible by the computer device 200 and includes both volatile and non-volatile media, removable and non-removable media.

The memory 210 may include a computer system readable medium in the form of volatile memory, such as a random access memory 240 (hereinafter referred to as RAM) and/or a high speed cache memory 250. The computer device 200 may further include other removable or non-removable, volatile or non-volatile computer system storage media. By way of example only, the storage system 260 may be configured to read and write a non-removable and non-volatile magnetic media (not shown in FIG. 10, commonly referred to as a "hard drive"). Although not shown in FIG. 10, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 230 via one or more data medium interfaces. The memory 210 may include at least one program product. The program product has a set (such as, at least one) of program modules configured to perform the functions of various embodiments of the present disclosure.

A program/utility 280 having a set (at least one) of the program modules 270 may be stored in, for example, the memory 210. The program modules 270 include but are not limited to, an operating system, one or more application programs, other programs modules, and program data. Each of these examples, or some combination thereof, may include an implementation of a network environment. The program modules 270 generally perform the functions and/or methods in the embodiments described herein.

The computer device 200 may also communicate with one or more external devices 290 (such as, a keyboard, a pointing device, a display 291, etc.). Furthermore, the computer device 200 may also communicate with one or more communication devices enabling a user to interact with the computer device 200 and/or other devices (such as a network card, modem, etc.) enabling the computer device 200 to communicate with one or more computer devices. This communication can be performed via the input/output (I/O) interface 292. Moreover, the computer device 200 may communicate with one or more networks (such as a local area network (hereafter referred to as LAN), a wide area network (hereafter referred to as WAN) and/or a public network such as an Internet) through a network adapter 293. As shown in FIG. 10, the network adapter 293 communicates with other modules of the computer device 200 over the bus 230. It should be understood that, although not shown in FIG. 10, other hardware and/or software modules may be used in connection with the computer device 200. The hardware and/or software includes, but is not limited to, microcode, device drivers, redundant processing units, external disk drive arrays, RAID systems, Drive and data backup storage system.

It should be illustrated that, the implementation process and technical principles of embodiments of the computer device refer to the explanations and illustrations made hereinbefore for the method for monitoring an operating status of a vehicle according to embodiments of a first aspect of the present disclosure, and will not be elaborated herein.

With the computer device according to embodiments of the present disclosure, the current position of the vehicle, the operation behavior information of the user and the operating status information of the in-vehicle component are acquired; the first running status of the vehicle is determined according to the operation behavior information of the user and the operating status information of the in-vehicle component; and the traffic information and the environmental information corresponding to the current position of the vehicle at current time are acquired from the network side according to the current position of the vehicle; further, the second running status of the vehicle is determined according to the traffic information and the environmental information; and then the current operating status of the vehicle is determined according to the matching degree between the first running status and the second running status. Therefore, the status of the vehicle can be predicted in advance according to the running position of the vehicle, the operation behavior of the user and the operating status of the in-vehicle component, which not only reduces the dependence on the vehicle sensor, but also facilitates the user to take a corresponding measure according to the predicted vehicle status, thereby providing safety and reliability guarantees for the user to drive the vehicle.

In order to implement the embodiments as described hereinbefore, embodiments of a fourth aspect of the present disclosure further provide a non-transitory computer-readable storage medium having stored therein a computer program that, when executed by a processor, causes the method for monitoring an operating status of a vehicle as described in any embodiment of the first aspect of the present disclosure to be implemented.

In an alternative implementation, the above non-transitory computer-readable storage medium may adopt any combination of one or more computer readable media. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage media include (a non-exhaustive list): an electrical connection having one or more wires, a portable computer disk, a hard disk, a random access memory (RAM), a read only memory (ROM), an Erasable Programmable Read Only Memory (EPROM) or a flash memory, an optical fiber, a compact disc read-only memory (CD-ROM), an optical memory component, a magnetic memory component, or any suitable combination thereof. In context, the computer readable storage medium may be any tangible medium including or storing a program. The program may be used by an instruction executed system, apparatus or device, or a connection thereof.

The computer readable signal medium may include a data signal propagating in baseband or as part of a carrier which carries a computer readable program code. Such propagated data signal may be in many forms, including but not limited to an electromagnetic signal, an optical signal, or any suitable combination thereof. The computer readable signal medium may also be any computer readable medium other than the computer readable storage medium, which may send, propagate, or transport a program used by an instruction executed system, apparatus or device, or a connection thereof.

The program code stored on the computer readable medium may be transmitted using any appropriate medium, including but not limited to wireless, wireline, optical fiber cable, RF, or any suitable combination thereof.

The computer program code for carrying out operations of embodiments of the present disclosure may be written in one or more programming languages or a combination thereof. The programming language includes an object oriented programming language, such as Java, Smalltalk, C++, as well as conventional Procedural programming language, such as "C" language or similar programming language. The program code may be executed entirely on a user's computer, partly on the user's computer, as a separate software package, partly on the user's computer, partly on a remote computer, or entirely on the remote computer or server. In a case of the remote computer, the remote computer may be connected to the user's computer or an external computer (such as using an Internet service provider to connect over the Internet) through any kind of network, including a Local Area Network (hereafter referred as to LAN) or a Wide Area Network (hereafter referred as to WAN).

In order to implement the embodiments as described hereinbefore, embodiments of a fifth aspect of the present disclosure further provide a computer program. When the computer program is executed by a processor, the method for monitoring an operating status of a vehicle as described in any embodiment of the first aspect of the present disclosure is implemented.

In the description of the present disclosure, it should be understood that, unless specified or limited otherwise, the terms "mounted", "connected", and "coupled" and variations thereof are used broadly and encompass such as mechanical or electrical mountings, connections and couplings, also can be inner communications or interactions of two components, and further can be direct or indirect mountings, connections, and couplings via intervening structures, which can be understood by those skilled in the art according to the detail embodiment of the present disclosure.

Reference throughout this specification to "an embodiment", "some embodiments", "an example", "a specific example", or "some examples", means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in another example", "in an example", "in a specific example", or "in some examples", in various places throughout this specification are not necessarily referring to the same embodiment or example of the present disclosure. Furthermore, the particular features, structures, materials, or characteristics may be combined in any suitable manner in one or more embodiments or examples. In addition, in the absence of contradiction, those skilled in the art can combine the different embodiments or examples described in this specification, or combine the features of different embodiments or examples.

In addition, terms such as "first", "second" and "third" are used herein for purposes of description and are not intended to indicate or imply relative importance or significance or to imply the number of indicated technical features. Thus, the feature defined with "first", "second" and "third" may include one or more of this feature.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, in which the order of execution is different from what is shown or discussed, including executing functions in a substantially simultaneous manner or in an opposite order according to the related functions. These and other aspects should be understood by those skilled in the art.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It can be understood by those ordinarily skilled in the art that all or part of the steps in the method of the above embodiments can be implemented by instructing related hardware via programs, the program may be stored in a computer readable storage medium, and the program includes one step or combinations of the steps of the method when the program is executed.

The computer readable storage medium may be, but is not limited to, read-only memories, magnetic disks, or optical disks.

Although explanatory embodiments have been shown and described, it would be appreciated by those skilled in the art that the above embodiments cannot be construed to limit the present disclosure, and changes, alternatives, modifications and variant can be made in the embodiments without departing from spirit, principles and scope of the present disclosure.

What is claimed is:

1. A method for monitoring an operating status of an autonomous vehicle, comprising:
    acquiring a current position of the autonomous vehicle, operation behavior information of a user and operating status information of an in-vehicle component in a running process of the autonomous vehicle;
    determining a first running status of the autonomous vehicle according to the operation behavior information of the user and the operating status information of the in-vehicle component;
    acquiring, according to the current position of the autonomous vehicle, traffic information and environmental information corresponding to the current position of the autonomous vehicle at current time from a network side;
    determining a second running status of the autonomous vehicle according to the traffic information and the environmental information;
    determining a current operating status of the autonomous vehicle according to a matching degree between the first running status and the second running status; and
    sending the current operating status of the autonomous vehicle to a vehicle managing server, so that the vehicle managing server determines a dispatching mode for the autonomous vehicle according to the current operating status of the autonomous vehicle.

2. The method according to claim 1, further comprising:
    transmitting the first running status to a client of the user currently using the vehicle; and
    updating the first running status according to responding information acquired from the client,
    after determining the first running status of the vehicle.

3. The method according to claim 2, further comprising:
correcting the acquired traffic information and the environmental information according to data collected by an in-vehicle sensor,
after acquiring the traffic information and the environmental information corresponding to the current position of the vehicle at the current time from the network side.

4. The method according to claim 2, wherein determining the current operating status of the vehicle according to the matching degree between the first running status and the second running status comprises: determining the current operating status of the vehicle according to a matching degree between the updated first running status and the second running status.

5. The method according to claim 1, further comprising: acquiring historical fault and maintenance information of the vehicle, before determining the first running status of the vehicle,
wherein determining the first running status of the vehicle comprises:
determining the first running status of the vehicle according to the operation behavior information of the user, the operating status information of the in-vehicle component, and the historical fault and maintenance information of the vehicle.

6. The method according to claim 5, further comprising:
correcting the acquired traffic information and the environmental information according to data collected by an in-vehicle sensor,
after acquiring the traffic information and the environmental information corresponding to the current position of the vehicle at the current time from the network side.

7. The method according to claim 1, further comprising:
correcting the acquired traffic information and the environmental information according to data collected by an in-vehicle sensor,
after acquiring the traffic information and the environmental information corresponding to the current position of the vehicle at the current time from the network side.

8. The method according to claim 1, further comprising:
correcting the acquired traffic information and the environmental information according to data collected by an in-vehicle sensor,
after acquiring the traffic information and the environmental information corresponding to the current position of the vehicle at the current time from the network side.

9. The method according to claim 1, wherein determining the current operating status of the vehicle according to the matching degree between the first running status and the second running status comprises:
comparing the matching degree with a preset threshold; and
determining that the current operating status of the vehicle is normal if the matching degree is greater than the preset threshold; or
determining that the current operating status of the vehicle is abnormal if the matching degree is equal to or less than the preset threshold.

10. A computer device, comprising:
a processor;
a memory; and
a computer program stored in the memory and executable by the processor,
wherein when the program is executed by the processor, a method for monitoring an operating status of an autonomous vehicle is implemented, wherein the method comprises:
acquiring a current position of the autonomous vehicle, operation behavior information of a user and operating status information of an in-vehicle component in a running process of the autonomous vehicle;
determining a first running status of the autonomous vehicle according to the operation behavior information of the user and the operating status information of the in-vehicle component;
acquiring, according to the current position of the autonomous vehicle, traffic information and environmental information corresponding to the current position of the autonomous vehicle at current time from a network side;
determining a second running status of the autonomous vehicle according to the traffic information and the environmental information;
determining a current operating status of the autonomous vehicle according to a matching degree between the first running status and the second running status; and
sending the current operating status of the autonomous vehicle to a vehicle managing server, so that the vehicle managing server determines a dispatching mode for the autonomous vehicle according to the current operating status of the autonomous vehicle.

11. The computer device according to claim 10, wherein the method further comprises:
transmitting the first running status to a client of the user currently using the vehicle; and
updating the first running status according to responding information acquired from the client,
after determining the first running status of the vehicle.

12. The computer device according to claim 10, wherein the method further comprises:
acquiring historical fault and maintenance information of the vehicle, before determining the first running status of the vehicle,
wherein determining the first running status of the vehicle comprises:
determining the first running status of the vehicle according to the operation behavior information of the user, the operating status information of the in-vehicle component, and the historical fault and maintenance information of the vehicle.

13. The computer device according to claim 10, wherein the method further comprises:
correcting the acquired traffic information and the environmental information according to data collected by an in-vehicle sensor,
after acquiring the traffic information and the environmental information corresponding to the current position of the vehicle at the current time from the network side.

14. A non-transitory computer-readable storage medium having stored therein a computer program that, when executed by a processor, causes a method for monitoring an operating status of an autonomous vehicle to be implemented, wherein the method comprises:
acquiring a current position of the autonomous vehicle, operation behavior information of a user and operating status information of an in-vehicle component in a running process of the autonomous vehicle;

determining a first running status of the autonomous vehicle according to the operation behavior information of the user and the operating status information of the in-vehicle component;

acquiring, according to the current position of the autonomous vehicle, traffic information and environmental information corresponding to the current position of the autonomous vehicle at current time from a network side;

determining a second running status of the autonomous vehicle according to the traffic information and the environmental information;

determining a current operating status of the autonomous vehicle according to a matching degree between the first running status and the second running status; and sending the current operating status of the autonomous vehicle to a vehicle managing server, so that the vehicle managing server determines a dispatching mode for the autonomous vehicle according to the current operating status of the autonomous vehicle.

15. The non-transitory computer-readable storage medium according to claim 14, wherein the method further comprises:

transmitting the first running status to a client of the user currently using the vehicle; and updating the first running status according to responding information acquired from the client, after determining the first running status of the vehicle.

16. The non-transitory computer-readable storage medium according to claim 14, wherein the method further comprises:

acquiring historical fault and maintenance information of the vehicle, before determining the first running status of the vehicle, wherein determining the first running status of the vehicle comprises:

determining the first running status of the vehicle according to the operation behavior information of the user, the operating status information of the in-vehicle component, and the historical fault and maintenance information of the vehicle.

17. The non-transitory computer-readable storage medium according to claim 14, wherein the method further comprises:

correcting the acquired traffic information and the environmental information according to data collected by an in-vehicle sensor, after acquiring the traffic information and the environmental information corresponding to the current position of the vehicle at the current time from the network side.

* * * * *